United States Patent [19]

Bush

[11] E Re. 30,682

[45] Reissued Jul. 21, 1981

[54] CRANKCASE EMISSION SEPARATOR AND COLLECTOR

[76] Inventor: Elmer W. Bush, 2010 Trimble Way, Sacramento, Calif. 95825

[21] Appl. No.: 150,015

[22] Filed: May 15, 1980

Related U.S. Patent Documents

Reissue of:

[64] Patent No.: 4,089,309
Issued: May 16, 1978
Appl. No.: 645,900
Filed: Dec. 31, 1975

[51] Int. Cl.[3] ..... F02M 25/06; B01D 39/06

[52] U.S. Cl. ..... 123/573; 55/512

[58] Field of Search ..... 123/572, 573, 574; 60/311; 55/512, 517

[56] References Cited

U.S. PATENT DOCUMENTS

| | | | |
|---|---|---|---|
| 1,990,657 | 2/1935 | Krieck | 123/574 |
| 2,354,722 | 8/1944 | Walton | 123/573 |
| 2,450,864 | 10/1948 | Callaway | 123/574 |
| 3,018,841 | 1/1962 | Gerlich | 60/311 |
| 3,182,803 | 5/1965 | Chisolm | 55/512 |
| 3,259,117 | 7/1966 | Ritchie | 123/573 |
| 3,415,041 | 12/1968 | Kraissl | 55/517 |
| 3,463,132 | 8/1969 | Krieck | 123/574 |
| 3,509,967 | 5/1970 | Ballard | 123/573 |
| 3,683,593 | 8/1972 | Kent | 55/512 |
| 3,769,798 | 11/1973 | Whittaker | 123/572 |
| 3,779,221 | 12/1973 | Gartner | 123/573 |
| 3,831,377 | 8/1974 | Morin | 60/311 |
| 3,913,541 | 10/1975 | Scott | 123/572 |
| 3,967,605 | 7/1976 | Dolfi | 123/574 |

*Primary Examiner*—Douglas Hart
*Attorney, Agent, or Firm*—Townsend and Townsend

[57] ABSTRACT

Interposed in a conduit which conducts crankcase emissions to the air-fuel intake side of an internal combustion engine is a vessel having means for separating deleterious liquid and solid components from the crankcase emissions and collecting these contaminants in the vessel. Atmospheric air is brought into collision with the emissions to enhance separation. The cleaned gaseous fraction, mixed with atmospheric air is then conducted from the vessel through a positive crankcase ventilation (PCV) valve interposed in the portion of the conduit leading from the separator-collector to the air-fuel intake side of the engine. The clean gas-air mixture joins the engine's air-fuel mixture in the combustion chamber and increases vehicle mileage.

At suitable intervals the separator-collector vessel is disconnected from the conduit and the collected contaminants are removed.

16 Claims, 4 Drawing Figures

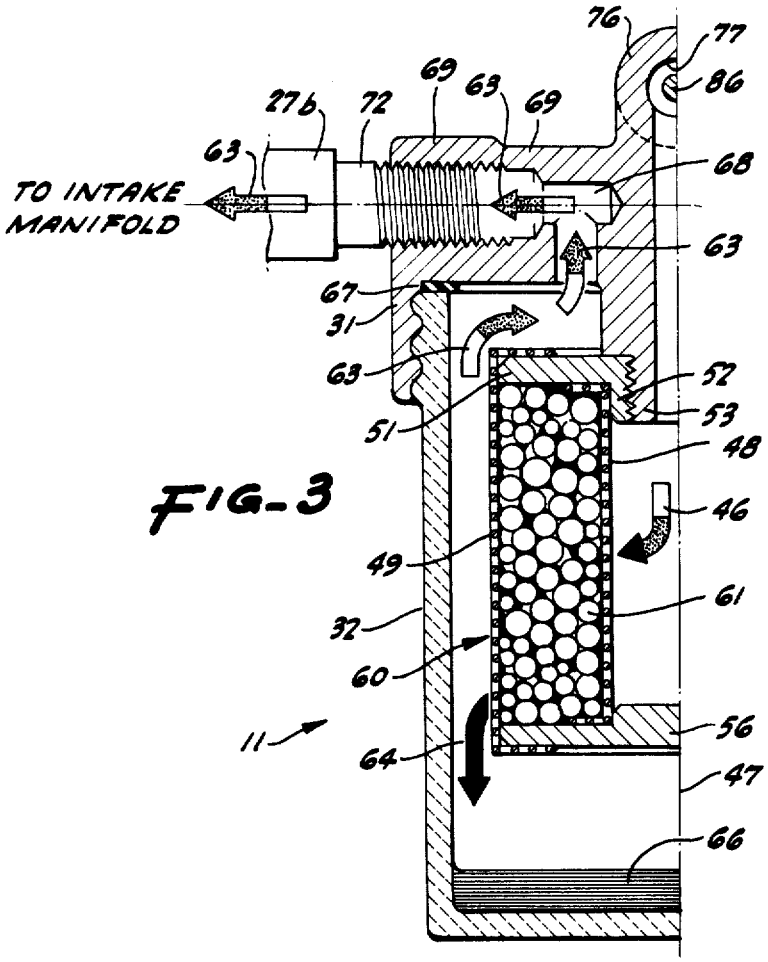
FIG-3
FIG-4
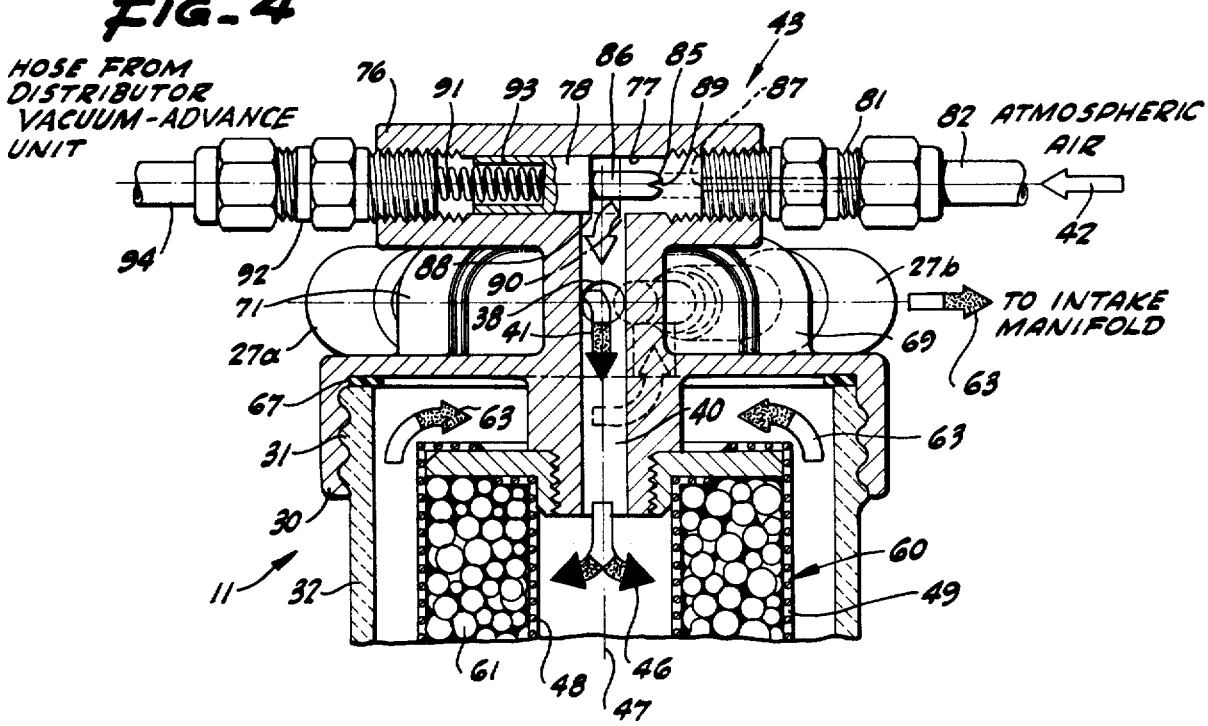

CRANKCASE EMISSION SEPARATOR AND COLLECTOR

Matter enclosed in heavy brackets [ ] appears in the original patent but forms no part of this reissue specification; matter printed in italics indicates the additions made by reissue.

BACKGROUND OF THE INVENTION

During the operation of an internal combustion engine a small portion of the air-fuel mixture inside the combustion chamber passes by the piston and piston rings into the crankcase just before combustion occurs. In like manner, exhaust fumes are forced past the piston rings into the crankcase just after combustion takes place. Collectively, these gases are termed blow-by, approximately 80% of which is unburned air-fuel mixture and 20% of which is a combustion product including water vapor, carbon dioxide and carbon monoxide.

Blow-by gases have always been a problem since, if they are allowed to remain in the crankcase, they form various deposits, acids and sludge, all of which are harmful to engine life and performance.

Traditionally, these fumes were vented to the atmosphere through a road draft tube. In recent years, however, the smog problem has created a need for preventing crankcase vapors from discharging into the atmosphere. As a consequence, positive crankcase ventilation (PCV) systems have been developed which recycle the engine blow-by gases back into the air-fuel induction system of the engine, thence into the combustion chambers where the hydrocarbons can be burned.

In order to maintan combustion efficiency during idling, deceleration, acceleration and cruising, a flow control valve is interposed in the conduit conducting the blow-by gases from the crankcase to the intake manifold. The flow control valve, termed a PCV valve is ordinarily modulated either by the extent of the pressure, or vacuum, in the crankcase or by the amount of vacuum in the intake manifold.

So long as the PCV valve works properly, the system serves its purpose in an effective manner. In fact, increased mileage is afforded by the return of unburned fuel to the combustion chambers of the engine.

Unfortunately, however, the PCV valve, which meters the flow of the crankcase emissions, often becomes clogged. When the valve sticks in one position, excessive air flow can unbalance the engine's air-fuel ratio, thus causing rough idling or even stalling. If the valve sticks in the other position, there is too little flow. In this situation the fumes will not be carried off and the crankcase will become contaminated with sludge, acid, and other harmful products which lead to engine corrosion, poor lubrication and eventual serious engine damage if the valve is not cleaned or replaced.

Clogging of the PCV valve frequently occurs since the crankcase emissions not only comprise air and blow-by, both of which pass harmlessly through the valve, but also water in both liquid and vapor phase, resins, varnishes and acids, as well as products of a carbonaceous and calcareous nature, the latter having its source in lubrication additives. Solids, such as soot and various oxidation products, are also present and further tend to interfere with the operation of the PCV valve.

In order to maintain the PCV valve and engine in good operating condition, it is desirable to separate out and collect these harmful fractions found in the crankcase emissions while permitting the harmless unburned gaseous hydrocarbons and air to continue on through the PCV valve, thence to the intake manifold.

The market place as well as the patent literature provide several types of devices which remove at least some of the deleterious components found in crankcase emissions and which also allow the harmless fraction to pass through.

A crankcase emission liquid collector is disclosed, for example, in U.S. Pat. No. 3,250,062 to H. F. Lusk. In this patent, centrifuging and expansion are utilized to effect separation.

There remains, however, considerable room for improvement.

SUMMARY OF THE INVENTION

The invention relates to devices for removing undesirable contaminants from crankcase emissions preferably prior to flow through the positive crankcase ventilation (PCV) valve installed pursuant to law on most internal conbustion engines of motor vehicles.

It is an object of the invention to provide a crankcase emission separator and collector which is compact in size, economical to purchase, easy to maintain, and readily installed, either at the factory or subsequently.

It is another object of the invention to provide a crankcase emission separator and collector which enables the PCV valve to operate at maximum efficiency for a protracted period of time without replacement or cleaning.

It is still another object of the invention to provide a crankcase emission separator-collector which helps to maintain engine performance and efficiency at a desirable level and which can be used to advantage, not only in the engines of passenger vehicles but also in stationary engines, boats, trucks, fork lifts, and the like, and whether or not the engine includes a PCV valve.

It is a further object of the invention to provide a crankcase emission separator and collector which is easily removed, cleaned and replaced.

It is yet a further object of the invention to provide a generally improved crankcase emission separator and collector which can beneficially be utilized in conjunction with internal combustion engines of all kinds.

Other objects, together with the foregoing are attained in the embodiment described in the following description and illustrated in the accompanying drawings.

BRIEF DESCRIPTION OF THE DRAWINGS

FIG. 3 is a fragmentary vertical sectional view, to an enlarged scale, taken on the line 3—3 in FIG. 1, showing the outlet port structure; and, FIG. 4 is a fragmentary vertical sectional view to an enlarged scale, taken on the line 4—4 in FIG. 2, showing the auxiliary air intake structure.

DETAILED DESCRIPTION OF PREFERRED EMBODIMENT

Figure 1:
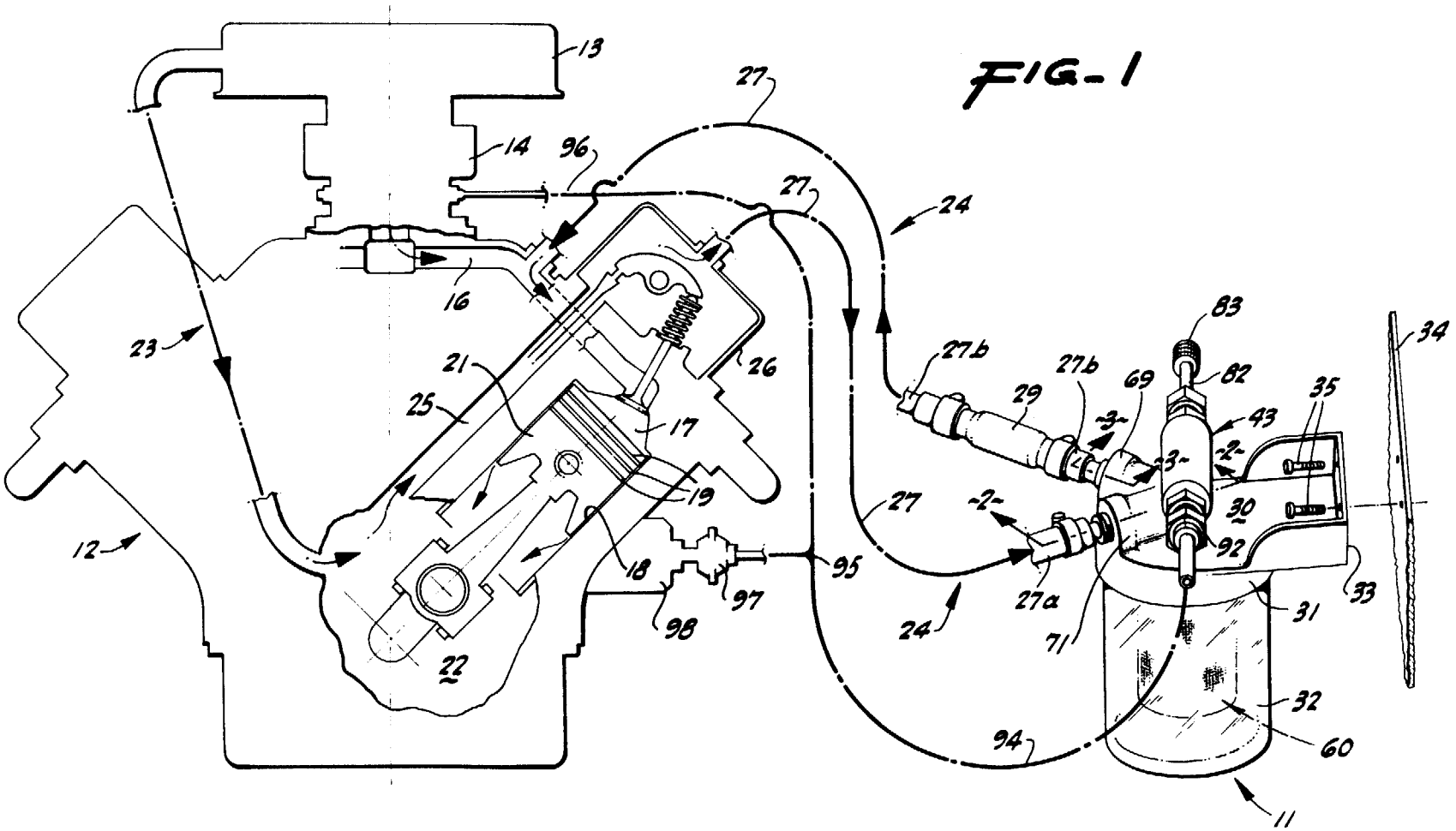
FIG. 1 is a diagrammatic representation of a typical installation, the scale of the separator-collector being to a somewhat enlarged scale in comparison with the engine.

While the crankcase emission separator-collector of the invention is susceptible of numerous physical embodiments, depending upon the environment and requirements of use, substantial numbers of the herein shown and described embodiment have been made, tested and used, and all have performed in an eminently satisfactory manner.

The crankcase emission separator and collector of the invention, generally designated by the reference numeral 11, is utilized in conjunction with an internal combustion engine 12 of a motor vehicle, for example.

In customary fashion the engine includes an air cleaner 13 and carburetor 14 from which the air-fuel mixture emerges into an intake manifold 16 leading to a combustion chamber 17 of an engine cylinder 18.

In well-known manner, a small portion of the air-fuel mixture inside the combustion chamber 17 is forced past the piston rings 19 of the piston 21 just before and just after combustion takes place. These "blow-by" gases, as previously explained, consist of unburned air-fuel mixture and combustion products including water, carbon dioxide and carbon monoxide, and if allowed to remain in the crankcase 22 will form various types of sludge, varnish deposits, acids and other products deleterious to engine life and performance.

Prior to 1960, the blow-by gases were vented through a pipe into the atmosphere, forming the first one of the four sources of atmospheric pollutants (viz., crankcase emissions, exhaust emission, particulates and evaporative losses) resulting from the operation of internal combustion engines.

Since 1960, positive crankcase ventilation (PCV) systems have been installed on most automotive engines in order to diminish or substantially eliminate crankcase emissions as a source of atmospheric pollutants. Such systems customarily utilize a first conduit 23 to lead fresh air from the air cleaner 13 into the crankcase 22, and a second conduit 24 to conduct the air plus blow-by mixture from the crankcase to the air-fuel intake side of the engine.

The second conduit 24 includes a passageway 25 from the crankcase 22 to the rocker arm cover 26 and a hose 27 from the rocker arm cover 26 to the intake manifold 16.

Heretofore, the PCV valve 29 interposed in the second conduit 24 has often been mounted on the rocker arm cover 26 or placed in the hose 27 at a suitable location; and in most cases the PCV valve 29 is so constructed that at least a small amount of air plus blow-by is allowed to flow from the crankcase to the intake manifold under all conditions of engine operation, even at idling. Spring-biased plungers, diaphragms, or other flow-modulating components (not shown) are provided so that during acceleration, or cruising, a greater volume of gases is allowed to flow than during idling.

So long as the PCV valve 29 effects flow regulation in the desired fashion, the ventilation system is successful in performing its intended function. Clogging of the valve, however, adversely affects engine performance and, as previously explained, can reduce engine life and cause other undesirable results.

In order to remove the deleterious liquid and solid contaminants which cause clogging and other harmful consequences but allow the scrubbed air plus blow-by fraction to continue through the PCV valve 29 and then into the intake manifold 16, the separator-collector 11 of the invention is preferably interposed in the second conduit 24 ahead of the PCV valve. Thus, as the crankcase emissions flow through the first portion 27a of the hose 27 extending from the rocker arm cover 26, the mixture of gases, liquids and solids enters a closure cap 30 or lid, suitably connected, as by a threaded collar 31 to a vessel 32. The lid 30 includes a bracket 33 which can be secured to an adjacent surface 34 such as the vehicle's fire wall, inner wall of a fender, or other location, as by fastenings 35.

The crankcase emissions arriving from the hose portion 27a pass through a nipple 36 in engagement with a threaded opening 37 in communication with a channel 38 leading to an inlet port 39 at the lower end of a vertical passageway 40.

Figure 2:
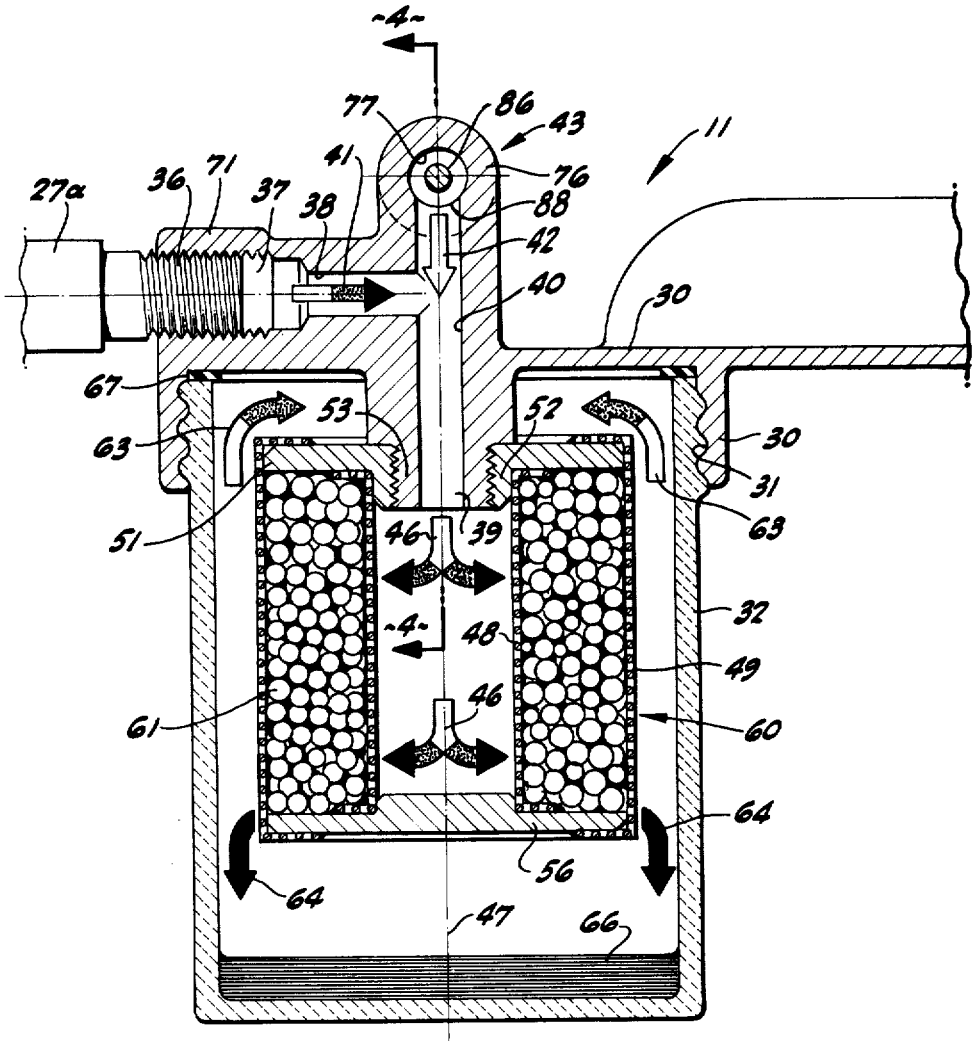
FIG. 2 is a median vertical sectional view of the separator-collector to an enlarged scale, the plane of the section being indicated by the line 2—2 in FIG. 1, showing the inlet port and auxiliary air intake structure.

As indicated in stylized fashion by the arrow 41 in FIG. 2, the crankcase emissions flowing through the channel 38 comprise: (1) undesirable liquid and solid components, indicated in solid black; (2) blow-by gases, shown in dotted fashion; and (3) air introduced into the crankcase through passageway 23, shown in FIG. 1, the air being shown as white, or blank.

The crankcase emissions 41 are at a somewhat elevated temperature and pressure, under most conditions, and in order to begin th condensation process, a stream of relatively cool atmospheric air, as shown by the arrow 42, as shown in FIG. 2, is injected into the path of the crankcase emissions 41 as they enter the vertical passageway 40. The atmospheric air 42 enters through an auxiliary air intake device 43, as will subsequently be explained in detail.

The collision between the cooler air 42 and the warmer fumes 41, accompanied by the abrupt change in direction as the fumes turn the corner and flow down the passageway 40, is followed by a sudden expansion of the mixture as it emerges from the inlet port 39.

As indicated by the arrows 46, the crankcase emission 41, diluted with cooler air 42 from the auxiliary air intake 43 flow axially downwardly along the axis 47 and radially outwardly. The expansion rate is so rapid that the process is substantially adiabatic, i.e. one in which there is no flow of heat into or out of the system. Since work is done by a mixture in adiabatic expansion, the temperature drops and in many instances a fog is observed inside the vessel 32 where the walls of the vessel are of transparent material.

The mixture 46 continues to expand axially and radially. The radial portion of the mixture 46 first passes through a fine mesh screen formed into a hollow, right circular cylindrical configuration 48. Encompassing and spaced radially from the inner cylinder 48 is an outer cylinder 49 also made from fine mesh screen.

The upper end of the inner cylinder 48 is flanged and secured, as by welding, to an upper circular disc 51 having an interiorly threaded boss 52 in threaded engagement with an exteriorly threaded stem 53 depending from the closure cover 30. The stem 53 is axially bored and forms the lower portion of the vertical passageway 40.

The lower end of the inner cylindrical screen 48 is likewise flanged and is secured to a lower circular disc 56.

The upper disc 51 and lower disc 56 likewise afford anchor points for the outer screen cylinder 49, the respective ends of which are flanged for additional strength and provide attachment points around the discs 51 and 56.

Disposed between the inner cylinder 48 and the outer cyliner 49 is a body of small discrete particles of relatively inert material, such as glass or fibreglass. A plurality of beads 61 having a diameter, for example, on the order of 3 mm., or less, and being of glass material, has been found to be very satisfactory. It is understood that, although beads 61 are depicted as substantially spherical, particles of other geometrical shapes, both regular or irregular may be employed, as desired, and that these particles may be solid or hollow. In addition, although beads are illustrated in the drawings, the particles may also be of a fibrous stranded, interwoven or other configuration, or a combination of shapes.

As the mixture 46 continues to expand, it passes through the interstices of the glass beads, or equivalent, the glass particles affording a very large surface area and a myriad of tortuous channels through which the mixture travels. The discrete glass particles themselves undergo no change and yet separation of the liquid and solid contaminants from the gaseous blow-by and air mixture is effected. Whether the large surface area of the individual small particles causes separation by surface adsorption of the contaminants or whether the particles cause separation by a process analogous to catalysis is not as yet established.

It is clear, however, that when the blow by-air mixture emerges from the outer screen cylinder and flows upwardly as indicated by the arrows 63, a high degree of separation, or "clarification", has occurred. At the same time, the undesirable solid and liquid fractions drain downwardly from the glass particles 61, as shown by the arrows 64, and descend to form a sludge body 66 in the bottom of the vessel 32.

At periodic intervals, the vessel 32 is unscrewed from the cap 30 for cleaning.

As appears most clearly in FIG. 3, the blow by-air mixture 63 ascends, passes upwardly through the central opening in an annular gasket 67, or seal, and enters an outlet channel 68 formed in the elongated, radial boss 69 on top of the cover 30. The boss 69 is comparable to the elongated radial boss 71 in which the inlet channel 38 is located, the bosses 69 and 71 being angularly displaced on the order of 45° (see FIG. 1).

The blow by-air mixture 63 enters a fitting 72 and then flows through hose portion 27b to PCV valve 29 which modulates flow rate in dependence upon engine operation. From the PCV valve 29, the blow by-air mixture continues through hose portion 27b and enters intake manifold 16 and thereafter combustion chamber 17.

With particular reference to FIGS. 1, 2 and 4, it can be seen that the auxiliary air intake device 43 is located on top of the closure cap 39 and, in fact, can be formed integrally therewith, if desired, although shown separately herein in the interests of greater clarity of disclosure.

The auxiliary air intake structure 43 includes a horizontal, hollow, right circular cylinder 76 provided with a bore 77 within which a plunger 78 translates between the "open" position shown in full line in FIG. 4 and the "substantially closed" position shown in broken line in FIG. 4.

At the right-hand end of the cylinder 76, the bore 77 is provided with a fitting 81 connected to a tube 32 into which atmospheric air 42 enters through a suitable filter 83 (see FIG. 1).

Air flow from the tube 82 is controlled by movement of the plunger 78. When the plunger 78 is "closed", the right hand end 85 of a stem 86 projecting from the plunger 78 substantially but not entirely covers and closes the opening 87 at the adjacent end of the fitting 81. Concurrently, when the end 85 of the stem 86 abuts the fitting 81, the plunger 78 almost but not entirely covers the exit port 88 of the right hand end of the bore 77.

In other words, the right hand end 85 of the plunger stem 86 has a plurality of notches 89 formed therein so that even when the end 85 abuts the fitting 81, a small amount of atmospheric air can bleed through the notches 89 and pass from the bore 77 down through a very small crack 90 when the plunger 78 substantially but not entirely covers the exit port 88.

A weak compression spring 91 is interposed between a threaded fitting 92 mounted on the left hand end of the cylinder 76 and the base of a blind hole 93 in the adjacent end of the plunger 78. The threaded fitting 92 is connected to a hose 94 extending to a T-fitting 95 in the hose 96 leading from the carburetor 14 at a location above, or ahead of, the customary throttle plate, to a conventional vacuum advance unit 97 connected to the vehicle's distributor 98 (see FIG. 1). It is clearly to be noted, however, that while the conventional vacuum advance mechanism on the distributor provides a convenient source of vacuum as a function of throttle opening, the auxiliary air device 43 can also be utilized where no distributor advance unit is available. Connection to another vacuum source, or to an electrically driven actuator is possible. Manual operation can also be used.

During idling, the throttle plate in the carburetor is substantially closed, and very little, if any, vacuum exists in the ported vacuum advance system. In this mode, the spring 91 urges the piston 78 toward "closed" position and only a small amount of atmospheric air bleeds past the notches 89 adjacent the opening 87 in the fitting 81 and through the crack 90 into the channel 40.

However, when the vehicle is accelerated, or during cruising, the throttle plate in the carburetor is open and vacuum exists in the ported vacuum advance system. A vacuum is thereby established in the connecting hose 94 and in the left hand end of the cylinder bore 77 in the vicinity of the compression spring 91. As a consequence, the differential pressure on the opposite ends of the piston 76 overcomes the spring urgency and drives the piston in a left-hand direction to the position shown in full line in FIG. 4.

This allows a stream of fresh atmospheric air to flow through the air filter 83, pipe 82 and through the opening 87 into the right hand portion of the bore, thence down through the exit port, as indicated by the arrow 42, into the channel 40 where it collides with the inflowing crankcase emissions 41 (see FIGS. 2 and 4). Customarily, the air filter 83 on the end of the pipe 82 is located under the vehicle's hood, at which position there is customarily at least a slight positive pressure resulting from car motion and fan operation. From the channel 40, the mixture 46 of crankcase emissions 41 and fresh air 42 descend, as previously explained, into the sleeve filter 60 where separation occurs as the mixture 46 expands and travels through the convoluted paths through the beads, the mixture being subjected to numerous collisions and numerous sudden changes of direction as a myriad of beads is encountered. Extensive tests appear to support the theory that the combination of expansion, successive impacts and abrupt changes in flow paths as the mixture passes through the beads tends to strip the entrained solids and liquids from the gaseous fractions. The gases and light hydrocarbon vapors proceed through the separator whereas the heavier liquid and solid components undergo a change which retards them and allows them to flow or drip down into the sludge pool 66 for subsequent removal. The "dry" hydrocarbons and air pass harmlessly through the PCV valve and are conducted to the combustion chamber for improved engine performance and longer life.

What is claimed is:

1. A crankcase emission fluid separator for use with an engine having a crankcase, an air intake leading to a combustion chamber and a vacuum source, said separator comprising:

a housing forming an enclosure and including inlet means adapted to be coupled to said engine crankcase for admitting emisions therefrom to the interior of said housing, outlet means adapted to be coupled to said air intake for furnishing separated fluids thereto, vacuum port means adapted to be coupled to said vacuum source, and air intake means for introducing ambient air into said housing; and means within said housing for conditioning engine crankcase emissions entering said housing via said inlet means and leaving said housing via said outlet means to separate liquid and solid components from gaseous components thereof, said conditioning means including a container having first and second apertured walls and a plurality of relatively inert particles located in said container between said walls and providing a barrier through which said emissions pass from said inlet means to said outlet means, fluid conduit means having a first end terminating adjacent one of said first and second container walls and a second end in fluid communication with said inlet means and said air intake means, and valve means coupled to said vacuum port means for controlling the quantity of ambient air admitted to said fluid conduit means in accordance with the magnitude of said vacuum source, said valve means including bias means for limiting the admission of ambient air into said fluid conduit means to a minimum amount when the magnitude of said vacuum source is a minimum and for permitting the amount of ambient air admitted to said fluid conduit means to increase as the magnitude of said vacuum source increases.

2. The combination of claim 1 wherein said relatively inert particles are fabricated from glass.

3. The combination of claim 1 wherein said relatively inert particles are fabricated from fiberglass.

4. The combination of claim 1 wherein said conditioning means includes a spaced pair of apertured wall members and wherein said particles are located therebetween.

5. The combination of claim 4 wherein said pair of apertured wall members are arranged to define an annular region comprising an inner and an outer wall member for containing said relatively inert particles, and further including first and second annular end wall members for enclosing said annular region.

6. The combination of claim 5 wherein said conditioning means is arranged within said housing so that said engine crankcase emissions entering said inlet means pass into the volume defined by the interior of said inner wall member and pass radially outwardly through said annular region to encounter said relatively inert particles.

7. In combination with a positive crankcase ventilation system connected to an internal combustion engine having a vacuum source and a crankcase, a device for conditioning crankcase emissions, said device comprising:

a [collecting vessel;] *collector;* a cap removably secured on one end of said [vessel] *collector;* an inlet port in said cap;

a first conduit connecting said inlet port with said crankcase;

an outlet port in said cap;

a second conduit connecting said outlet port and the air-fuel intake side of said engine; and means located within said collector for separating liquid and solid contaminants from crankcase emissions entering said collector through said inlet port and leaving said collector through said outlet port, said separating means including a spaced pair of screens and a plurality of beads between said screens, said screens and said beads being interposed between said inlet port and said outlet port, said pair of screens and said beads defining a hollow circular cylinder with one of said screens forming the outer wall and the other of said screens forming the inner wall, said cylinder being located on said cap relative to said inlet port so that the crankcase emissions flowing inwardly through said inlet port pass into the interior of said cylinder; and said outlet port being located relative to said cylinder so that the gases emerging from said outer screen wall of said cylinder flow outwardly through said outlet port; and means for introducing atmospheric air into said device adjacent said inlet port, said air introducing means including a hollow cylindrical member, a piston slidable in said cylindrical member, a passageway leading from the inside to the outside of said cylindrical member, said piston substantially covering said passageway when in a first position and uncovering said passageway when in a second position, a hose connecting one end of said cylindrical member to said vacuum-source, an air intake means for introducing atmospheric air to the other end of said cylindrical member, said other end of said cylindrical member being in communication with said passageway when said piston is in said second position, and spring means for urging said piston from said second position towards said first position, the urging force of said spring means being overcome as the differential pressure on said piston exceeds a predetermined amount as a vacuum is established on the end of said piston opposite from the piston [and] *end* facing said other end of said cylindrical member and atmospheric air enters said other end of said cylindrical member.

*8. For use with a crankcase ventilation system connected to an internal combustion engine having a vacuum source and a crankcase, a fluid separator device for conditioning crankcase emissions, said device comprising:*

*a collecting vessel;*

*a cap removably secured on one end of said vessel;*

*an inlet port in said cap;*

*a first conduit connecting said inlet port with said crankcase;*

*an outlet port in said cap;*

*a second conduit connecting said outlet port and the air-fuel intake side of said engine;*

*means located within said collecting vessel for separating liquid and solid contaminants from crankcase emissions entering said collector through said inlet port and leaving said collector through said outlet port, said separating means including a spaced pair of screens and a plurality of beads between said screens, said screens and said beads being interposed between said inlet port and said outlet port, said pair of screens and said beads defining a hollow circular cylinder with one of said screens forming the outer wall and the other of said screens forming the inner wall, said cylinder being located on said cap relative to said inlet port so that the crankcase emissions flowing inwardly through said inlet port pass into the interior of said cylinder; and said outlet port being located relative to said cylinder so that the gases emerging from said outer screen wall of said cylinder flow outwardly through said outlet port; and*

*means for introducing atmospheric air into said device adjacent said inlet port, said air introducing means including a hollow cylindrical member, a piston slideable in said cylindrical member, a passageway leading from the inside to the outside of said cylindrical member, said piston substantially closing said passageway when in a first position and opening said passageway when in a second position, means for connecting one end of said cylindrical member to said vacuum source, an air intake means for introducing atmospheric air to the other end of said cylindrical member, said other end of said cylindrical member being in communication with said passageway when said piston is in said second position, and spring means for urging said piston from said second position towards said first position, the urging force of said spring means being overcome as the differential pressure on said piston exceeds a predetermined amount as a vacuum is established on the end of said piston opposite from the piston end facing said other end of said cylindrical member and atmospheric air enters said other end of said cylindrical member.*

*9. A crankcase emission fluid separator for use with an engine having a crankcase, an air intake leading to a combustion chamber and a vacuum source, said separator comprising:*

*a housing forming an enclosure and including inlet means adapted to be coupled to said engine crankcase for admitting emissions therefrom to the interior of said housing, outlet means adapted to be coupled to said air intake for furnishing separated fluids thereto, vacuum port means adapted to be coupled to said vacuum source, and air intake means for introducing ambient air into said housing; and*

*means within said housing for conditioning engine crankcase emissions entering said housing via said inlet means and leaving said housing via said outlet means to separate liquid and solid components from gaseous components thereof, said conditioning means including a container having first and second apertured walls and a plurality of relatively inert particles located in said container between said walls and providing a barrier through which said emissions pass from said inlet means to said outlet means, fluid conduit means having a first end terminating adjacent one of said first and second container walls and a second end in fluid communication with said inlet means and said air intake means, and valve means coupled to said vacuum port means for allowing the admission of ambient air to said fluid conduit means in response to the existence of a vacuum in said vacuum source, said valve means including bias means for normally urging said valve means towards a closed position, the urging force provided by said bias means being overcome by the differential force provided by said vacuum means when a vacuum of sufficient magnitude is present.*

*10. The combination of claim 9 wherein said relatively inert particles are fabricated from glass.*

*11. The combination of claim 9 wherein said relatively inert particles are fabricated from fiberglass.*

*12. The combination of claim 9 wherein said conditioning means includes a spaced pair of apertured wall members and wherein said particles are located therebetween.*

*13. The combination of claim 12 wherein said pair of apertured wall members are arranged to define an annular region comprising an inner and outer wall member for containing said relatively inert particles, and further including first and second annular end wall members for enclosing said annular region.*

*14. The combination of claim 13 wherein said conditioning means is arranged within said housing so that said engine crankcase emissions entering said inlet means pass into the volume defined by the interior of said inner wall member and pass radially outwardly through said annular region to encounter said relatively inert particles.*

*15. The combination of claim 1, 7, 8 or 12 wherein said vacuum source comprises a distributor vacuum advance unit.*

*16. The combination of claim 1, or 12 wherein said air intake and said vacuum source are discrete and separate elements.*

* * * * *